(12) United States Patent
Langenfelder et al.

(10) Patent No.: US 7,565,166 B2
(45) Date of Patent: Jul. 21, 2009

(54) NON-INTERACTING TRANSMISSION OF IDENTIFICATION INFORMATION ON COMMUNICATION LINES

(75) Inventors: Frank Langenfelder, Nürnberg (DE); Ulrich Sinn, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 607 days.

(21) Appl. No.: 11/281,668

(22) Filed: Nov. 17, 2005

(65) Prior Publication Data

US 2006/0107079 A1 May 18, 2006

(30) Foreign Application Priority Data

Nov. 18, 2004 (EP) .................................. 04027454

(51) Int. Cl.
*H04B 1/38* (2006.01)
*G08B 13/14* (2006.01)

(52) U.S. Cl. ................. 455/557; 455/420; 455/314; 455/556.1; 340/568.1

(58) Field of Classification Search ............... 455/557, 455/420, 344, 349, 556.1; 340/568.1, 568.4, 340/572.8; 318/568.11
See application file for complete search history.

(56) References Cited

U.S. PATENT DOCUMENTS

| | | | |
|---|---|---|---|
| 6,167,464 A | 12/2000 | Kretschmann | |
| 6,459,778 B1 * | 10/2002 | Shirai | 379/93.29 |
| 6,751,570 B2 * | 6/2004 | Boswell et al. | 324/750 |
| 2001/0035729 A1 * | 11/2001 | Graiger et al. | 318/587 |
| 2003/0083839 A1 * | 5/2003 | Boswell et al. | 455/422 |
| 2004/0229648 A1 * | 11/2004 | Yamamoto et al. | 455/557 |
| 2005/0265245 A1 * | 12/2005 | Buchner et al. | 370/241 |

FOREIGN PATENT DOCUMENTS

| | | |
|---|---|---|
| EP | 1 338 935 A1 | 8/2003 |
| WO | WO 02/078914 A1 | 10/2002 |

* cited by examiner

*Primary Examiner*—Lana N Le

(57) ABSTRACT

The invention relates to a connectivity box (1) and a method for connecting a mobile device (2), in particular an operator panel for an automation system, to a permanently installed infrastructure (3), the connectivity box (1) possessing an identity (ID) which is transmitted to the mobile device (2). The connection of the mobile device (2) is implemented for example via a cable which is plugged into the connectivity box (1). In this arrangement the existing signal lines (4) are used for transmitting the identity (ID) or, as the case may be, the box address. The lines are looped through for standard communication. However, when a mobile device (2) is connected, the lines are separated and connected to a control logic (5) on the mobile device side. By this means the identity (ID) of the connectivity box (1) is transmitted to the mobile device (2).

24 Claims, 4 Drawing Sheets

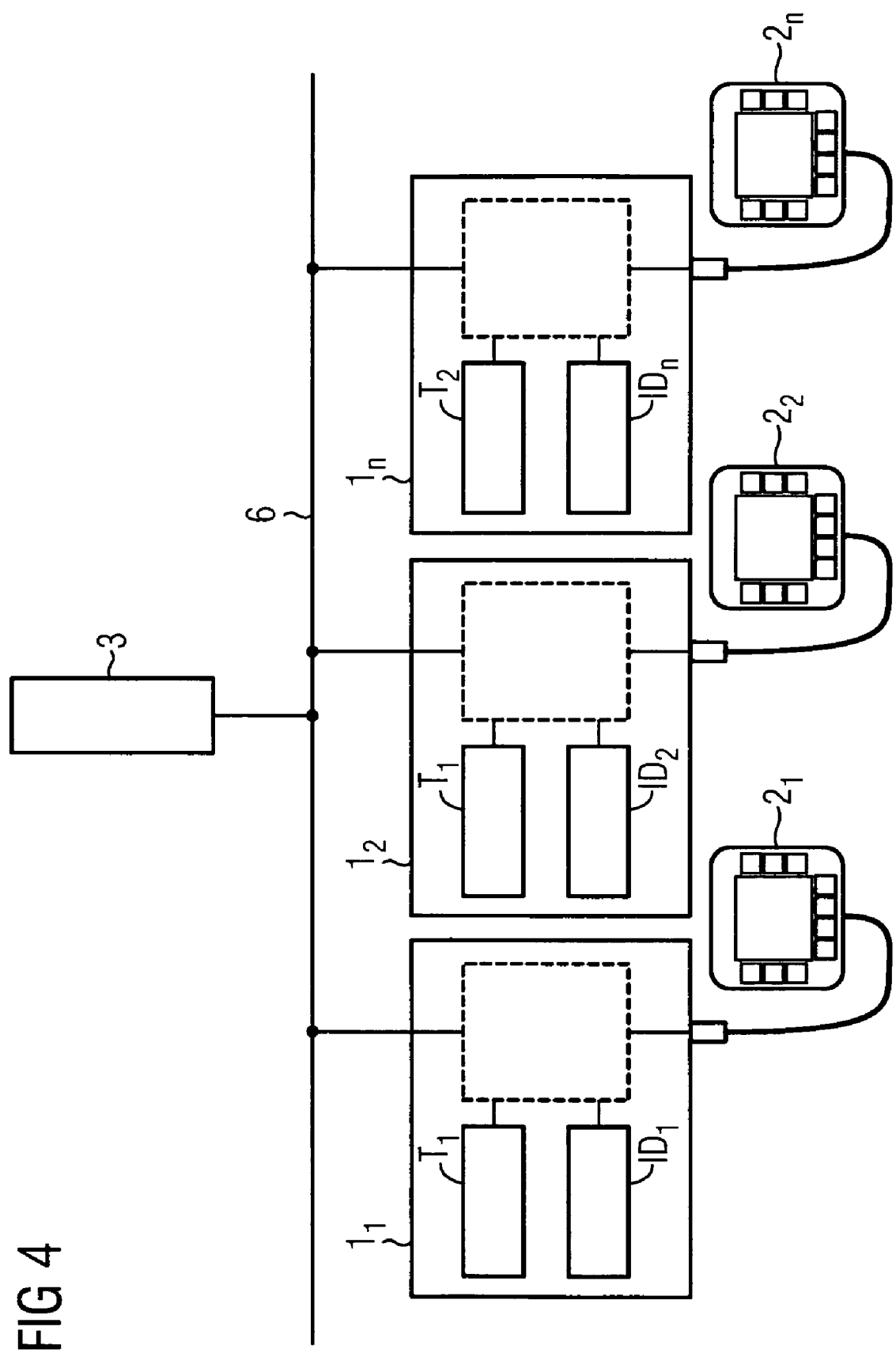

NON-INTERACTING TRANSMISSION OF IDENTIFICATION INFORMATION ON COMMUNICATION LINES

CROSS REFERENCE TO RELATED APPLICATIONS

This application claims priority to the European application No. 04027454.0, filed Nov. 18, 2004 and which is incorporated by reference herein in its entirety.

FIELD OF INVENTION

The invention relates to a connectivity box and a method for connecting a mobile device, in particular an operator panel for an automation system, to a permanently installed infrastructure, the connectivity box possessing an identity which is transmitted to the mobile device.

SUMMARY OF THE INVENTION

Mobile control devices, referred to as "mobile operator panels", are being used increasingly in today's automation environment. The mobile operator panels are portable and can be connected by an operator of an installation to various units of the automation system, programmable logic controllers, for example, or machine tools. In this arrangement, what is referred to as a "connectivity box" is typically used to connect the mobile operator panel to the permanently installed infrastructure of the automation system or, as the case may be, of the automated installation, the operator panel being connected to the connectivity box via a connecting cable.

The mobile operator panel subsequently communicates via the connectivity box and the necessary infrastructure, a bus system for example, with the programmable logic controller or even a numerical control. In this case the interface between the mobile operator panel and the connectivity box is formed by the following signals:

Transmit data (TXD),
Receive data (RXD),
Request to send (RTS) and
Clear to send (CTS).

Here, transmit and receive data are always connected to the programmable logic controller or, as the case may be, numerical control, while Request to Send and Clear to Send are likewise connected to the control(ler) depending on the selected interface type.

If a plurality of connectivity boxes are connected to a control(ler), via which connectivity boxes a plurality of mobile operator panels can be connected to the control(ler) simultaneously, information with respect to which mobile operator panel communicates via which connectivity box may be necessary. For example, information of said type enables location-based services and information to be offered on the corresponding mobile operator panel. For this reason the connectivity box requires a unique box address or identity which is communicated to the mobile operator panel and hence to the user.

Today's connectivity boxes are equipped for identification purposes with an output which indicates whether a mobile operator panel is connected or not. Said output indicating the identity can be connected to a control(ler) and evaluated there. However, if a plurality of mobile operator panels are connected to a control(ler) simultaneously via a plurality of connectivity boxes, this information is no longer unique.

The object of the present invention is therefore to specify a connectivity box and a method which transmits an identity of the connectivity box in a simple manner to a connected mobile device.

The object is achieved by a connectivity box for connecting a mobile device, in particular an operator panel for an automation system, to a permanently installed infrastructure, wherein the connectivity box possesses an identity and wherein the connectivity box has signal lines for communication between the mobile device and the permanently installed infrastructure, with at least one of the signal lines provided for communication being provided for transmitting the identity of the connectivity box to the mobile device and with the transmission of the identity being effected by the establishment of a connection of the at least one signal line to the mobile device being provided before the start of the communication between the mobile device and the permanently installed infrastructure.

The object is also achieved by a method for connecting a mobile device, in particular an operator panel for an automation system, to a permanently installed infrastructure by means of a connectivity box, the connectivity box possessing an identity, wherein the identity of the connectivity box is transmitted to the mobile device by means of at least one signal line provided for communication between the mobile device and the permanently installed infrastructure and the transmission of the identity is accomplished by the establishment of a connection of the at least one signal line to the mobile device before the start of the communication between the mobile device and the permanently installed infrastructure.

The invention is based on the knowledge that when a plurality of mobile operator panels are used, it is advantageous for the operator of an automation system if the identity of the connectivity box via which the mobile operator panel is connected to the permanently installed infrastructure is known. Because the identity of the connectivity box is known, a unique assignment of operator panel and connectivity box is made possible even if there is a plurality of connectivity boxes and a plurality of operator panels. Based on the known identity of the connectivity box, services and information for example can be provided in a location-based manner.

According to the invention, no separate or additional lines are required in the connecting cable for the transmission of the identity of the connectivity box. The existing infrastructure in the connecting cable is simply extended and can therefore be used for the transmission of the identity. The connecting cable remains the same; the connectivity box is extended. Furthermore this also enables the operation of mobile operator panels and connectivity boxes which cannot receive or send any corresponding information, that is to say the identity of the connectivity box. In addition, a disruption or a negative impact on other communication services is precluded within the scope of the invention. This is achieved according to the invention through the use of already existing signal lines which, after transmission of the identity of the connectivity box to the mobile operator panel, can be used for normal data transmission. Thus, the identity is transmitted by the connectivity box to the mobile operator panel prior to the start of the actual communication.

A further advantageous embodiment of the invention is characterized in that the establishment of the connection is provided when the mobile device is connected to the connectivity box and/or when an operating voltage of the connectivity box and/or of the mobile device is switched on. By means of this advantageous embodiment it is made possible for the identity of the connectivity box also to be transmitted to the mobile operator panel when the two are already connected to each other via the connecting cable, but no voltage is present on the corresponding devices. Only when the devices become operable as a result of the operating voltage being switched on and the identity of the connectivity box becomes relevant, is said identity transmitted to the mobile operator panel.

A further advantageous embodiment of the invention is characterized in that before the connection of at least one signal line for transmitting the identity to the mobile device is established there is provided a separation of the signal line from the permanently installed infrastructure and a connection to a control logic. The transmission of the identity of the connectivity box is made possible by the simple act of switching over from the signal transmission between mobile operator panel and control(ler) to a connection of the mobile operator panel to a control logic in the connectivity box in a simple manner using existing signal lines. In this arrangement the control logic is implemented in the connectivity box itself, which permits the corresponding hardware to be of simple design.

A further advantageous embodiment of the invention is characterized in that a second signal line is provided for transmitting a handshake protocol. By this means the speed of transmission of the box address can be controlled. The signal line for transmitting the handshake protocol is composed in this case of the RTS line from the mobile operator panel to the connectivity box and the CTS line from the connectivity box to the mobile operator panel. The sending or transmission of the address is coordinated by this means. With this approach there is likewise a separation of the second signal line from the permanently installed infrastructure and a connection to the control logic. Thus, the existing infrastructure is also used for transmitting the handshake protocol. A timing of the transmission is performed here by the mobile operator panel via the RTS line, which leads from the mobile operator panel to the connectivity box.

A further advantageous embodiment of the invention is characterized in that the connectivity box has an identifier, the identifier being provided for transmitting to the mobile device. As well as the identity the connectivity box can therefore also transmit its type, which for example provides information about the technical features of the connectivity box, to the mobile operator panel. On the basis of the identifier it is possible for example for other devices to adjust to the technical features of the connectivity box.

A further advantageous embodiment of the invention is characterized in that the connectivity box has means enabling a user to set the identity. In this way the address or, as the case may be, the identity of the connectivity box can be set or, as the case may be, modified by a user of an operator panel. The identity or address can be set here for example via rotary coding switches. In a hexadecimal implementation, for example, a corresponding rotary coding switch can support a setting of 16 permutations per switch. With two rotary coding switches that makes a total of 256 different addresses or identities, by means of which 256 different connectivity boxes for example can be differentiated on an installation.

The invention will be described and explained in more detail below with reference to the exemplary embodiment shown in the figures.

BRIEF DESCRIPTION OF THE DRAWINGS

FIG. 4 is a schematic representation of an automation device having a plurality of mobile operator panels.

DETAILED DESCRIPTION OF THE INVENTION

Figure 1:
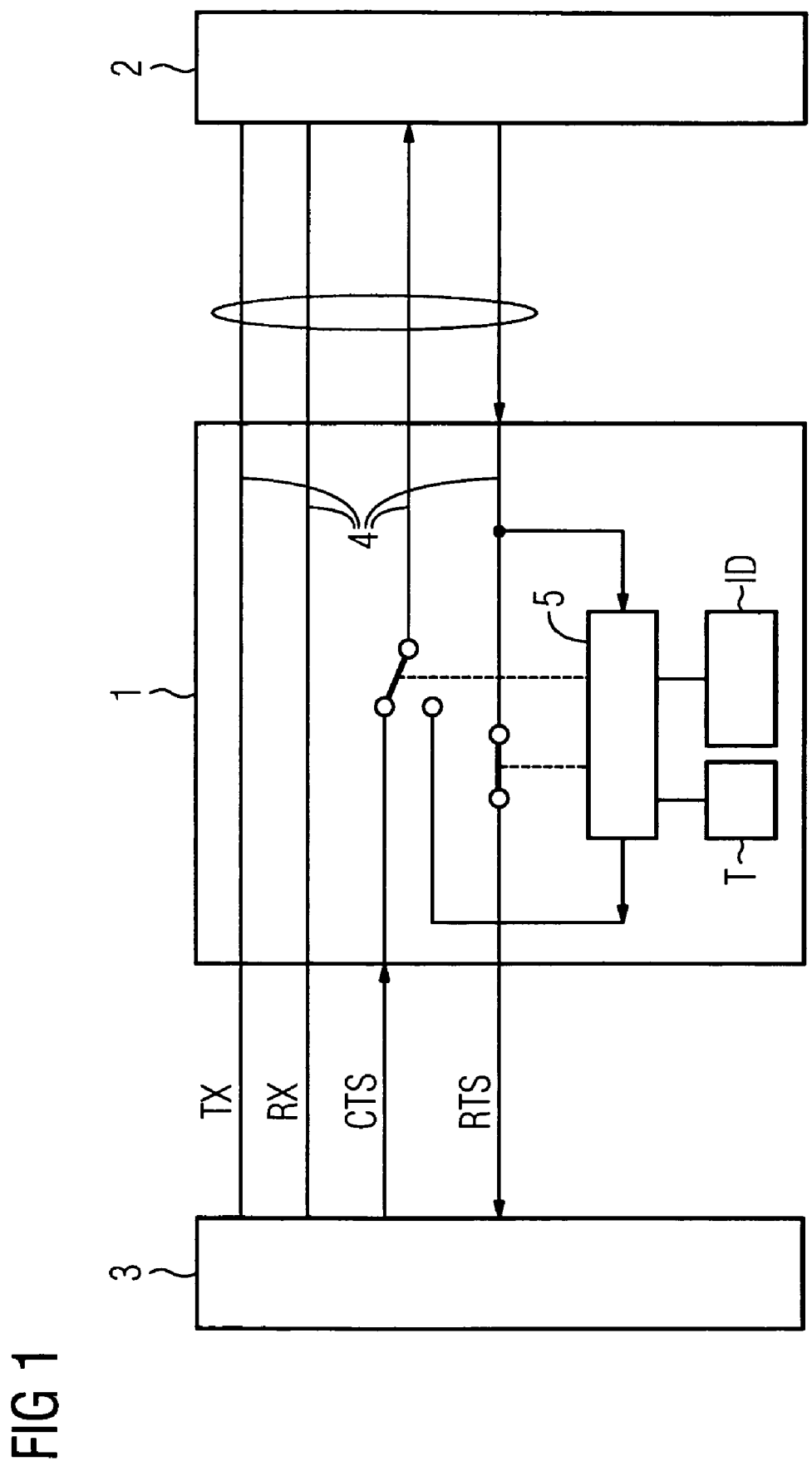
FIG. 1 is a schematic representation of a connectivity box for connecting a mobile device to a permanently installed infrastructure.

FIG. 1 shows a connectivity box 1 which connects a mobile device 2 to a control(ler) 3 which represents the permanently installed infrastructure. In this arrangement the connection is established via signal lines 4 which are provided for transmitting data (TX), receiving data (RX), a Request to Send (RTS) and a Clear to Send (CTS). With a suitably present interface type, the RTS line and the CTS line are used for controlling the data transmission. What is referred to as a "handshake protocol" for controlling the speed of the data transmission is transmitted via the two lines. The connectivity box 1 has a control logic 5 as well as an identity ID and an identifier T.

During standard communication between the mobile device 2 and the control(ler) or the permanently installed infrastructure 3, the lines 4 are looped through the connectivity box 1. In other words, all lines 4 between mobile device 2 and control(ler) 3 are connected end-to-end. The mobile device 2 and the control(ler) 3 can communicate unhindered.

Figure 2:
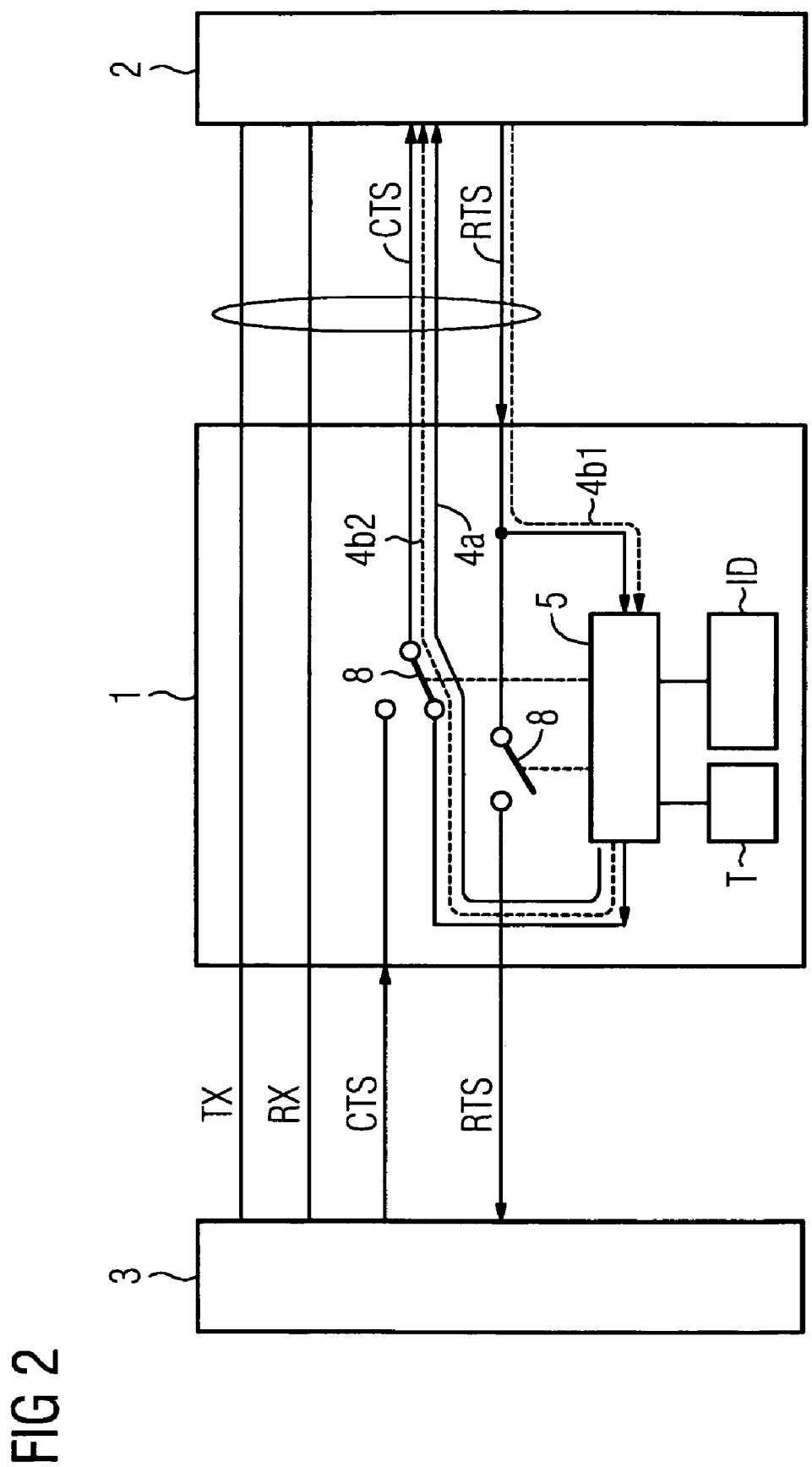
FIG. 2 is a schematic representation of a connectivity box for transmitting its identity to the mobile operator panel before the start of the communication.

FIG. 2 shows a connectivity box 1 which is in a status prior to the start of communication between the mobile device 2 and the control(ler) 3. For example, the connecting cable of a mobile operator panel has just been connected or the operating voltage of connectivity box 1 and mobile operator panel has been switched on. The lines RTS and CTS are separated from the control(ler) 3 by the control logic 5 and connected to the control logic 5. As a result the mobile operator panel 2 is directly connected to the control logic 5. The connection is made for example via switches 8, as shown in FIG. 2. A connection can also be created in some other way, however.

The identity ID or, as the case may be, address of the connectivity box 1 is then transmitted via the line 4a from the connectivity box 1 to the mobile operator panel 2, the transmission of the identity ID being controlled in this case by means of a handshake protocol. Toward that end, signals are transmitted on the RTS line 4b1 from the mobile device 2 to the connectivity box 1 and on the CTS line 4b2 from the connectivity box 1 to the mobile device 2. The identity ID is also transmitted on the CTS line 4b2 from the connectivity box 1 to the mobile device 2. This is controlled by the mobile device 2 by means of a timing signal on the RTS line 4b1. Also transmitted in this case in addition to the identity ID is the identifier T, which describes the type of the connectivity box 1. On completion of the transmission the control logic 5 is separated from the lines RTS and CTS and the two lines are once again looped through so that the communication between mobile device 2 and control(ler) 3 can be resumed.

Figure 3:
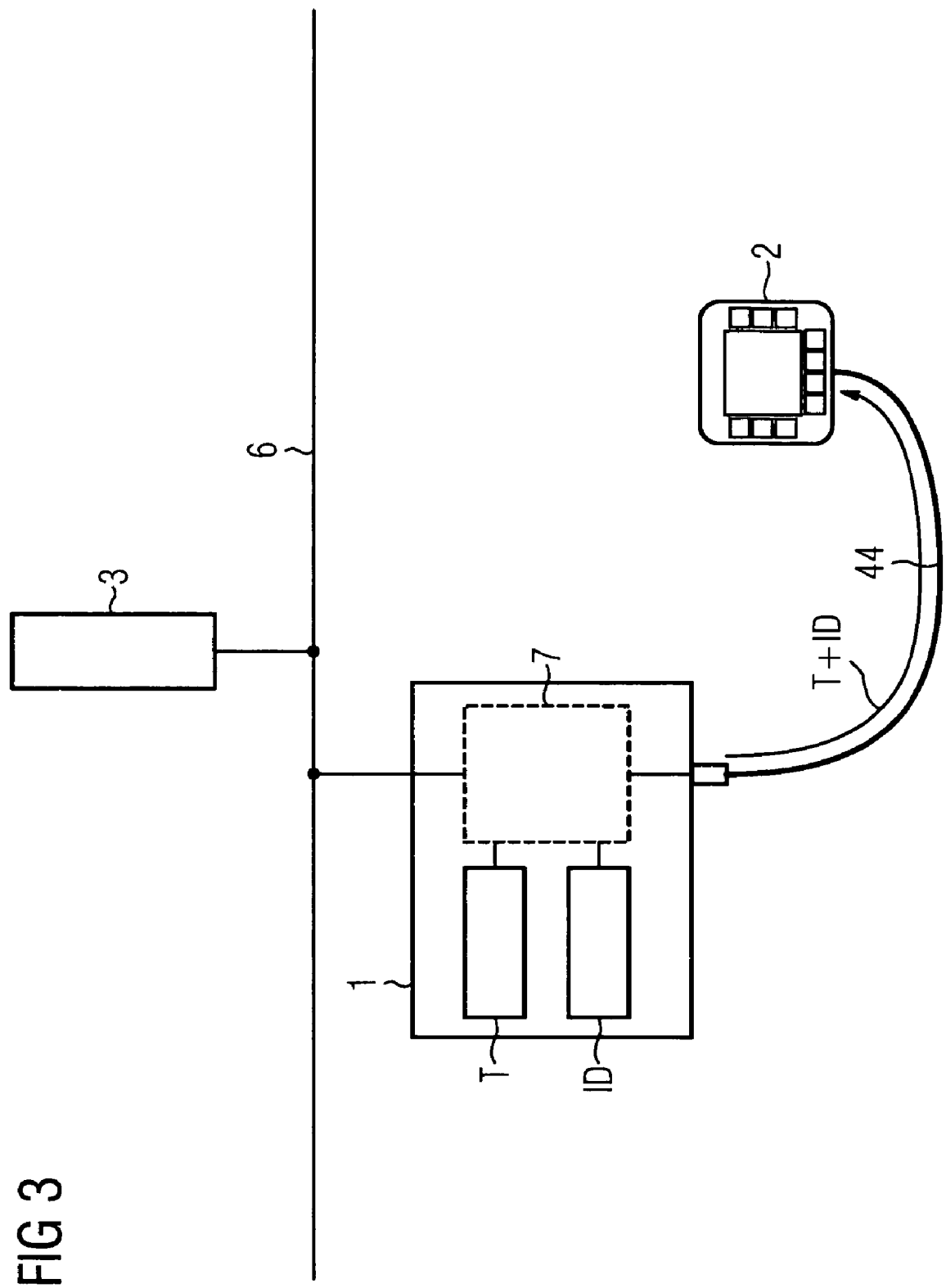
FIG. 3 is a schematic representation of an automation system having a mobile operator panel.

FIG. 3 shows an overview of an automation system in which a control(ler) 3 or some other automation component is connected to a connectivity box 1 via a fieldbus or an Ethernet 6. The connectivity box 1 serves to connect a mobile device 2, for example a mobile operator panel which is used to control the control(ler) or, as the case may be, the automation system. The mobile operator panel 2 is connected to the connectivity box 1 via a cable 44. The connectivity box 1 has an identity ID or, as the case may be, a box address which can be freely set by a user for example. The identity ID can be set for example via what are known as rotary coding switches. Further possibilities for setting the identity are, for example, programming in an engineering environment. This is provided within the scope of the system via the infrastructure.

The connectivity box 1 also has an identifier T which is used for describing the type of the connectivity box. A transmission logic 7 is implemented in the connectivity box 1. When the mobile device 2 is connected or operating voltage is supplied, the identity ID and the identifier T of the connectivity box 1 are transmitted to the mobile device 2 with the aid of the transmission logic 7. This is accomplished via existing lines in the connecting cable 44. The transmission takes place before the communication between the mobile device 2 and the control(ler) 3 to be controlled is initiated.

FIG. 4 shows an exemplary embodiment in which a plurality of mobile devices $2_1$, $2_2$, $2_n$ are connected to a control (ler) 3 via a bus system or an Ethernet 6. The mobile devices are connected via different connectivity boxes $1_1$, $1_2$ and $1_n$, each of which has an identity $ID_1$, $ID_2$ and $ID_n$. The connectivity boxes $1_1$, $1_2$ and $1_n$ likewise have an identifier $T_1$, $T_2$. Both identity ID and identifier T are transmitted before the start of the communication between the mobile device 2 and the control(ler) 3 by the respective connectivity boxes $1_1$, $1_2$, $1_n$ to the mobile devices connected thereto. By this means the respective identity of the connectivity box can be read out and is known to the mobile device. With a plurality of mobile operator panels and a plurality of connectivity boxes which are connected to a control(ler) 3, the identity ID via which services and information can be provided in a location-based manner and the technical features of the connectivity box used are known.

To sum up, the invention relates to a connectivity box 1 and a method for connecting a mobile device 2, in particular an operator panel for an automation system, to a permanently installed infrastructure 3, the connectivity box 1 possessing an identity ID which is transmitted to the mobile device 2. The connection of the mobile device 2 is implemented for example via a cable which is plugged into the connectivity box 1. In this arrangement the existing signal lines 4 are used for transmitting the identity ID or, as the case may be, the box address. The lines are looped through for standard communication. However, when a mobile device 2 is connected, the lines are separated and connected to a control logic 5 on the mobile device side. By this means the identity ID of the connectivity box 1 is transmitted to the mobile device 2.

The invention claimed is:

1. An automation system comprising:
    a connectivity box having technical features unique to said connectivity box, the connectivity box chosen from a plurality of connectivity boxes, wherein at least some of said plurality of connectivity boxes have distinct technical features;
    a mobile device distinctly responsive to the distinct technical features; and
    a permanently installed infrastructure comprising a controller;
    wherein the connectivity box is arranged to interconnect the mobile device to the controller, the connectivity box comprising:
        an identity for establishing a unique assignment between the mobile device and the connectivity box in correspondence with the unique technical features of the connectivity box; and
        signal lines for a communication between the mobile device and the controller,
        wherein at least one of the signal lines is switchingly connectable for transmitting the identity of the connectivity box to the mobile device, and
    wherein the transmission of the identity is effected by establishing a connection of the at least one signal line to the mobile device before starting the communication between the mobile device and the controller.

2. The system as claimed in claim 1, wherein the mobile device is an operator panel.

3. The system as claimed in claim 1, wherein establishing of the connection is provided when the mobile device is connected to the connectivity box and/or when an operating voltage of the connectivity box and/or of the mobile device is switched on.

4. The system as claimed in claim 1, wherein before the connection of the at least one signal line for transmitting the identity is established to the mobile device, a separation of the signal line from the controller and a connection to a control logic for the connectivity box are provided.

5. The system as claimed in claim 4, wherein the control logic is arranged in the connectivity box.

6. The system as claimed in claim 1, wherein a second signal line is provided for transmitting a handshake protocol.

7. The system as claimed in claim 6, wherein a physical line is provided for implementing the signal lines.

8. The system as claimed in claim 6, wherein a separation of the second signal line from the controller and a connection to a control logic for the connectivity box are provided.

9. The system as claimed in claim 1, wherein a timing signal is provided on the second signal line for controlling the transmission of the identity.

10. The system as claimed in claim 1, wherein the connectivity box has an identifier and wherein the identifier is provided for transmission to the mobile device.

11. The system as claimed in claim 1, wherein the connectivity box comprises a mechanism for setting the identity by a user.

12. The system as claimed in claim 11, wherein the mechanism for setting the identity is a rotary coding switch.

13. The system as claimed in claim 11, wherein the mechanism for setting the identity is an engineering environment.

14. A method for interconnecting an automation system, the method comprising:
    providing a plurality of connectivity boxes, wherein at least some of said plurality of connectivity boxes have distinct technical features
    choosing a connectivity box from the plurality of connectivity boxes, the chosen connectivity box having technical features unique to said connectivity box;
    interconnecting the connectivity box to 1) a mobile device distinctly responsive to the distinct technical features, and 2) a permanently installed infrastructure comprising a controller;
    assigning a unique identity to the connectivity box; and
    transmitting the identity of the connectivity box to the mobile device by means of at least one signal line switchingly connectable for communication between the mobile device and the permanently installed infrastructure, wherein
    the identity is transmitted by establishment of a connection of the at least one signal line to the mobile device before the start of communication between the mobile device and the controller, wherein
    the transmitting of the identity of the connectivity box to the mobile device allows establishing a unique assignment between the mobile device and the connectivity box in correspondence with the unique technical features of the connectivity box.

15. The method as claimed in claim 14, wherein the mobile device is an operator panel for the automation system.

16. The method as claimed in claim 14, wherein the connection is established when the mobile device is connected to the connectivity box and/or when an operating voltage of the connectivity box and/or of the mobile device is switched on.

17. The method as claimed in claim 14, wherein before the connection of the at least one signal line for transmitting the identity is established to the mobile device, the signal line is separated from the controller and connected to a control logic for the connectivity box.

18. The method as claimed in claim 14, wherein a handshake protocol is transmitted by means of a second signal line.

19. The method as claimed in claim 18, wherein the signal lines are implemented by means of a physical line.

20. The method as claimed in claim 18, wherein the second signal line is separated from the controller and connected to a control logic for the connectivity box.

21. The method as claimed in claim 14, wherein the transmission of the identity is controlled by a timing signal on the second signal line.

22. The method as claimed in claim 14, wherein the connectivity box transmits an identifier to the mobile device.

23. The method as claimed in claim 14, wherein the identity of the connectivity box is set by a user.

24. The method as claimed in claim 23, wherein the identity is set by means of rotary coding switches.

\* \* \* \* \*